United States Patent
Almulhem et al.

(10) Patent No.: US 6,510,135 B1
(45) Date of Patent: Jan. 21, 2003

(54) FLOW-LEVEL DEMULTIPLEXING WITHIN ROUTERS

(75) Inventors: Abdulaziz S. Almulhem, Dhahran (SA); John E. Vincent, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/215,376

(22) Filed: Dec. 18, 1998

(51) Int. Cl.[7] .............................................. G01R 31/08
(52) U.S. Cl. ....................................... 370/229; 370/392
(58) Field of Search ........................... 370/389, 369–72, 370/380, 329–30, 395.1, 396–99, 395.3, 395.4, 395.41, 395.52, 395.53, 395.65, 395.7, 412, 414, 418, 231, 235–6, 351

(56) References Cited

U.S. PATENT DOCUMENTS

| | | | | |
|---|---|---|---|---|
| 5,577,038 A | * | 11/1996 | Miyahara | 370/352 |
| 5,745,486 A | | 4/1998 | Beshai et al. | 370/352 |
| 6,111,858 A | * | 8/2000 | Greaves et al. | 370/256 |
| 6,122,274 A | * | 9/2000 | Kumar | 370/338 |
| 6,335,930 B1 | * | 1/2002 | Lee | 370/387 |

* cited by examiner

*Primary Examiner*—David Vincent (57) ABSTRACT

A packet routing system is disclosed that allows for efficient transfer of data flows from router to router with use of supertrunking. The router that receives a data flow inputs the packets of the data flow, determines the logical output port corresponding to the data flow, assigns the entire data flow to a physical output port within the logical output port with use of a load balancing function, encapsulates each packet within a Packet Forwarding Header (PFH) and a Rotator Information Unit (RIU) header that identifies the assigned physical output port, and outputs the encapsulated packets of the data flow to the assigned physical output port. The assigned physical output port removes the PFH and the RIU header from each packet and outputs the packets to a physical link. The router that receives the packets can treat the packets of the particular data flow like typical packets since all the packets of the same data flow traverse the same physical link resulting in no mis-ordering of packets.

16 Claims, 4 Drawing Sheets

FLOW-LEVEL DEMULTIPLEXING WITHIN ROUTERS

RELATED APPLICATIONS

U.S. patent applications entitled "Supertrunking for Packet Switching" and "Scheduling Technique for Delayed Queue Service" both by Almulhem et al, both filed on the same day as the present application, and both assigned to the assignee of the present application, disclose and claim subject matter related to that of the present invention and are herein incorporated by reference.

FIELD OF THE INVENTION

This invention relates generally to data routing systems and more specifically to data routing systems over multiple physical links.

BACKGROUND OF THE INVENTION

The following paragraphs give definitions of terms used throughout this document.

Physical link: a single point-to-point (PPP) serial transmission link between two nodes in the network (such as between two routers or between a router and a host machine). The implementation of a serial link may take various forms such as an optical fibre or a wavelength segment on an optical fibre, among other options.

Physical input/output port: the input/output port of the router that supports one physical link.

Logical link: a point-to-point traffic path between two routers that is composed of multiple physical links and appears from a routing point of view to be one link.

Logical input/output port: the collection of physical input/output ports that support the physical links of a logical link.

Supertrunk: the aggregation of physical links into larger, logical links.

Transmission Control Protocol (TCP): a library of routines that applications can use when they need reliable network communications with another computer. TCP is responsible for verifying the correct delivery of data from client to server. It adds support to detect errors or lost data and to trigger reconstruction until the data is correctly and completely received.

Internet Protocol (IP): a library of routines that TCP calls on, but which is also available to applications that do not use TCP. IP is responsible for transporting packets of data from node to node. It forwards each packet based on a four-byte destination address (the IP address).

There has been an incredible increase in demand for bandwidth within communication routing systems over the past few years. This increase is particularly pronounced when considering the increase in data networking information transferred within these systems directly associated with the expanding popularity of the Internet. Soon the traffic rates needed between router pairs will be higher than the serial link transmission technology available. Currently, the highest transmission rate is 9.6 Gb/s, (on a single wavelength) but 2.4 Gb/s is much more commonly available. Purchasers of routers are already demanding 2.4 Gb/s links and it is expected that within a short time, some routes will require multiple physical links.

There are other reasons why multi-link routes are attractive. In situations where routers are clustered in close physical proximity, the use of multiple links might allow the interconnect to be multiple low cost links rather than single high cost connections. Another reason is that the application of the multi-link approach might also be a fast way to provide higher rate ports on existing routers. Yet another reason is that the use of multiple links allows more granularity of growth than the large steps in the transmission network and so may allow savings in bandwidth costs. Finally, another reason is that multiple links can allow for redundancy to cover link failure without requiring the spare link to cover the whole bandwidth of the route.

When using multiple links between two routers, it is a requirement that the total bandwidth be used efficiently. That is to say, the traffic offered must be spread over all available links, hereinafter referred to as load balancing. It would not be acceptable to have one link under utilized while traffic is queued on another. This suggests that packets from any source can be delivered over any link to any destination. In fact, because of the bursting nature of the traffic, allocating links statically to particular sources or destinations would result in inefficient use of the total available bandwidth.

When data traffic flows are spread over multiple links, successive packets from a particular flow (for example, a TCP connection between two IP hosts) can travel over different lengths and may arrive at the destination out of order. The variability of delay can be caused by different path lengths or different congestion levels on the paths, as well as the normal indeterminacy introduced by queuing and scheduling. The TCP can accommodate some mis-ordering of packets, but there is a problem if too much mis-ordering occurs on a connection where the transmitter is using the fast retransmission protocol.

This mis-ordering of packets forces routers receiving these packets to comprise a sorting function that is capable of re-ordering the packets into the proper order. This sorting function is likely to be relatively complex and cause a delay in the delivery of data flows to the destination. As well, if the receiving router is not setup for receiving packets of a single flow along multiple physical links and therefore does not have a sorting function, significant errors would occur within the transmission, delaying it further.

Therefore, a router is required that will allow the use of multiple physical links for transmitting data traffic without requiring re-ordering of packets or any other special functions at the receiving router. This router must ensure that the order of the packets during transmission is maintained, but still allow for efficient load balancing between physical links.

SUMMARY OF THE INVENTION

It is an object of the present invention to overcome the disadvantages of the prior art and, in particular, to provide an apparatus and method for increasing the efficiency of data communications.

According to a first aspect, the present invention provides a forwarding node capable of operation within a router that transfers digital data with a plurality of other routers within a packet routing system, the forwarding node comprising: a load balancing device that, when input with individual packets of a data flow, reads a logical output port corresponding to the data flow, assigns the data flow to a physical output port within the logical output port based upon physical link criteria, and outputs the individual packets to their assigned physical output port.

According to a second aspect, the present invention provides a router capable of operation within a packet routing system that transfers digital data between a plurality of the routers, the router comprising: a route controller; a rotator space switch; at least one first forwarding node, coupled to both the route controller and the rotator space switch, comprising a load balancing device that, when input with individual packets of a data flow, reads a logical output port corresponding to the data flow, assigns the data flow to a physical output port within the logical output port based upon physical link criteria, and outputs the individual packets to their assigned physical output port; and at least one second forwarding node, coupled to both the route controller and the rotator space switch, that is arranged to operate as a physical output port for outputting packets to at least one transmission apparatus.

According to a third aspect, the present invention provides a packet routing system that transfers digital data between at least one first router and at least one second router, the packet routing system comprising: the first router comprising: a route controller; a rotator space switch; at least one first forwarding node, coupled to both the route controller and the rotator space switch, comprising a load balancing device that, when input with individual packets of a data flow, reads a logical output port corresponding to the data flow, assigns the data flow to a physical output port within the logical output port based upon physical link criteria, and outputs the individual packets to their assigned physical output port; and at least one second forwarding node, coupled to both the route controller and the rotator space switch, that is arranged to operate as a physical output port for outputting packets to at least one transmission apparatus; a plurality of transmission apparatuses coupled between the first and second routers; and the second router comprising: a second route controller; a second rotator space switch; at least one third forwarding node, coupled to both the second route controller and the second rotator space switch, that is arranged to operate as a physical input port for receiving packets from at least one transmission apparatus; and at least one fourth forwarding node, coupled to both the second route controller and the second rotator space switch, that, when input with packets from the third forwarding node, outputs a data flow corresponding to the inputted packets.

According to a fourth aspect, the present invention provides in a packet routing system comprising a plurality of routers, a method of transferring digital data between the routers comprising the steps of: inputting individual packets of a data flow into a first router; reading a logical output port corresponding to the data flow of the individual packets; assigning each of the data flows to a physical output port within the logical output port based upon physical link criteria; transmitting each of the packets, via their assigned physical output ports, to a second router; and outputting a data flow corresponding to the packets received at the second router.

BRIEF DESCRIPTION OF THE DRAWINGS

The preferred embodiment of the present invention is described with reference to the following figures, in which.

DETAILED DESCRIPTION OF THE PREFERRED EMBODIMENT

Figure 1A:
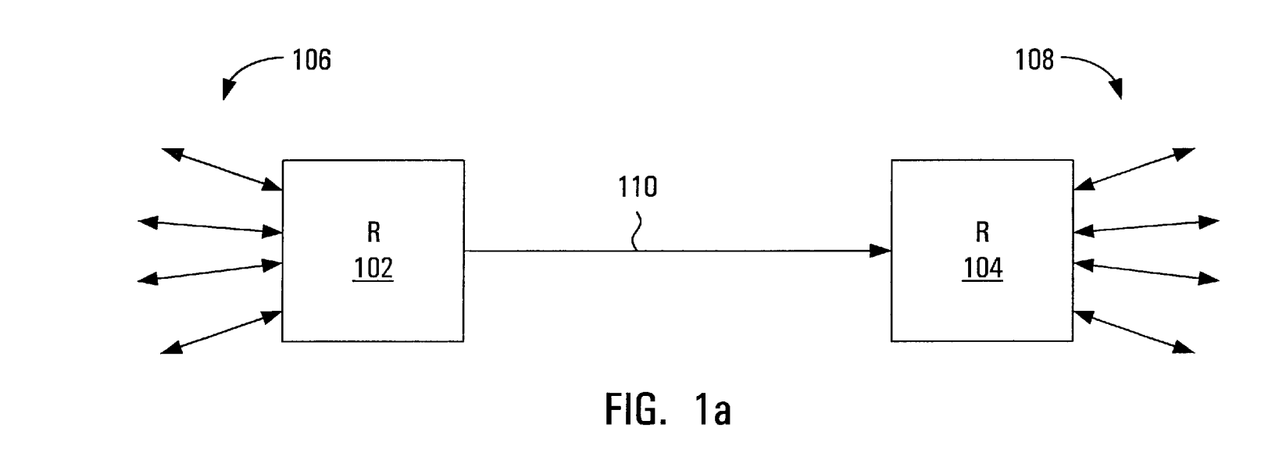
FIGS. 1a and 1b are simplified diagrams illustrating logical and physical routing links respectively.
Figure 1B:
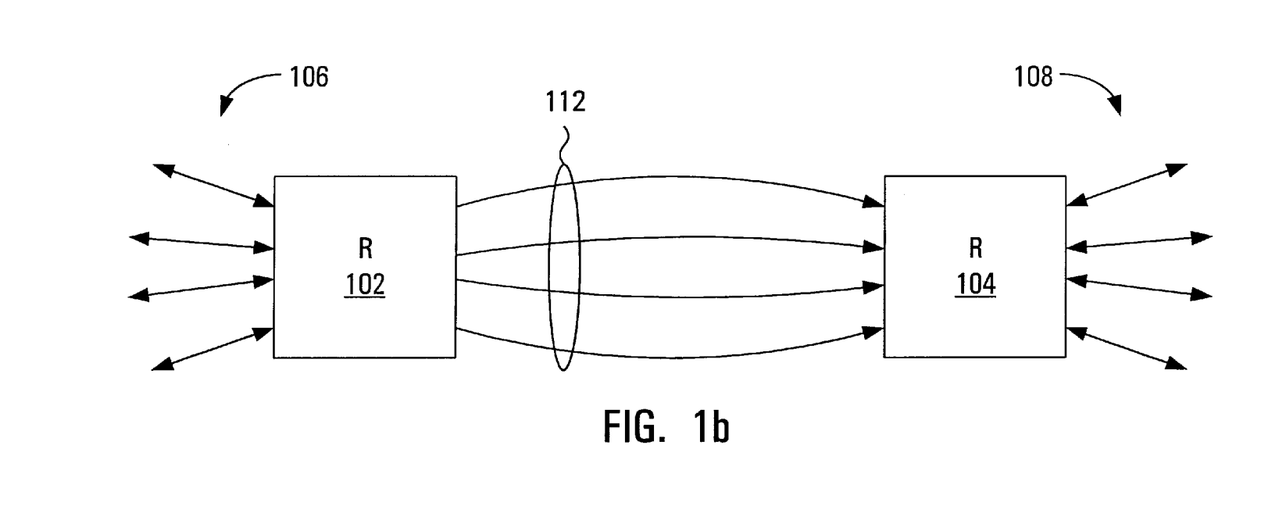

FIGS. 1a and 1b illustrate example logical and physical routing systems respectively that depict communication links from a first router 102 to a second router 104. Both the first and second routers 102, 104 are connected to a plurality of other communication links 106, 108 respectively. Within FIG. 1a, a logical link 110 is shown coupled between the routers 102, 104. In this particular example, the logical link is a 3.5 Gb/s connection. FIG. 1b illustrates a series of physical links 112, that make up a supertrunk, coupled between the routers 102, 104 that together are equivalent to the logical link 110. The supertrunk 112, in this example, comprises four physical links that when combined total the 3.5 Gb/s of the logical link 110.

Each of the physical links 112 depicted in FIG. 1b may be implemented with a series of connections within a series of different networks. Despite appearing within FIG. 1b as being directly connected and physically local, it should be understood that physical links 112 are typically quite complex with the routers 102, 104 possibly a large distance from each other.

Figure 2:
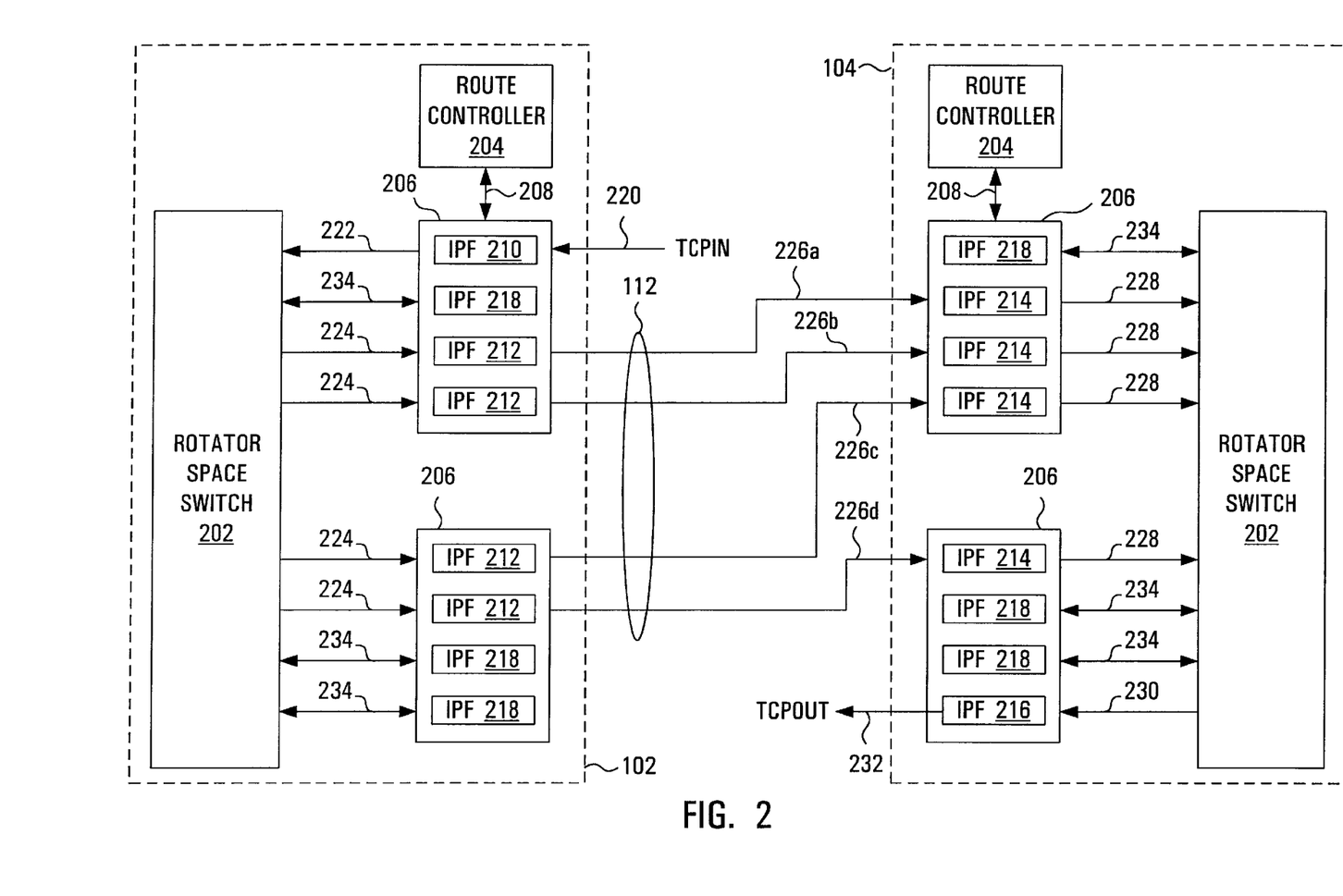
FIG. 2 is a block diagram of a routing system according to an example application of the preferred embodiment of the present invention.

FIG. 2 is a block diagram of a routing system between the first router 102 and the second router 104 illustrating an example application of the preferred embodiment of the present invention. Each router 102, 104, according to the preferred embodiment, comprises a rotator space switch 202, a route controller 204, and a plurality of transport nodes 206. The routers 102, 104 depicted in FIG. 2 each comprise two transport nodes, though this is not meant to limit the scope of the present invention. The rotator space switch 202 and the route controller 204 are independently coupled to each transport node 206, although, within FIG. 2, the route controller 204 is only shown to be coupled to one transport node 206 via signal bus 208.

A person skilled in the art would understand that the operation of the rotator space switch 202 and the route controller 204 would be specific to a particular company's implementation. For example, one such rotator space switch is disclosed in U.S. Pat. No. 5,745,486 entitled "High Capacity ATM Switch" by Beshai et al and assigned to the assignee of the present invention. No modifications are made in the route controller 204 and the rotator space switch 202 from prior art devices within the preferred embodiment of the present invention.

Each transport node 206 comprises a plurality of Internet Protocol Forwarding (IPF) nodes 210, 212, 214, 216, 218. In FIG. 2, each transport node 206 comprises four IPF nodes, though this is not meant to limit the scope of the present invention. In fact, the routers 102, 104, in an alternative embodiment, do not comprise transport nodes, but instead have a plurality of IPF nodes, coupled independently to the route controller 204 and the rotator space switch 202, that are not within transport nodes.

The IPF nodes, within the system depicted in FIG. 2, include an input IPF node 210, a plurality of supertrunk output IPF nodes 212 representing a single logical output port, a plurality of supertrunk input IPF nodes 214 representing a single logical input port, an output IPF node 216, and a plurality of other IPF nodes 218 which are unrelated to the description herein below of an example application of the preferred embodiment of the present invention. Each IPF node, according to the preferred embodiment, is identical. Hence, any one of the IPF nodes may, in practice, be an input IPF node, a supertrunk output IPF node, a supertrunk input IPF node, or an output IPF node.

As depicted in FIG. 2, the input IPF node 210 is within a transport node of the first router 102 and is input with a TCP input signal (TCPIN) via line 220. The input IPF node 210 is coupled to the rotator space switch 202 of the first router 102 via line 222.

The plurality of supertrunk output IPF nodes 212 are spread across the transport nodes 206 of the first router 102. In this example, there are four supertrunk output IPF nodes 212 with two in each transport node 206 of the first router 102, though other configurations are possible. The supertrunk output IPF nodes 212 are each independently coupled to the rotator space switch 202 of the first router 102 via lines 224 and, via the supertrunk 112, to the second router 104. The supertrunk 112 comprises physical links 226a, 226b, 226c, 226d between the supertrunk output IPF nodes 212 (the physical output ports) within the first router 102 and the supertrunk input IPF nodes 214 (the physical input ports) within the second router 104.

The supertrunk input IPF nodes 214 are spread across the two transport nodes 206 of the second router 104. In this example, there are four supertrunk input IPF nodes 214, three in one transport node 206 and one in the other. This illustrated configuration is not meant to limit the scope of the present invention and it should be recognized that the number of supertrunk input IPF nodes 214 does not have to equal the number of supertrunk output IPF nodes 212. A single supertrunk output IPF node 212 could be coupled via a plurality of physical links to a plurality of supertrunk input IPF nodes 214 and a plurality of supertrunk output IPF nodes 212 could be coupled to the same supertrunk input IPF node 214. Each of the supertrunk input IPF nodes 214 are independently coupled to the rotator space switch 202 of the second router 104 via lines 228.

The output IPF node 216 is within the transport node 206 of the second router 104 that has only one supertrunk input IPF node 214, but it is recognized that the output IPF node 216 could be located in any transport node 206 of the second router 104. The output IPF node 216 is coupled to the rotator space switch 202 of the second router 104 via line 230 and outputs a TCP output signal (TCPOUT) via line 232.

The other IPF nodes 218 are simply shown within FIG. 2 to illustrate that other operations are being performed concurrently with the example application described herein below. Each of the other IPF nodes 218 is coupled to the rotator space switches 202 of the respective router 102, 104 via lines 234.

Figure 6:
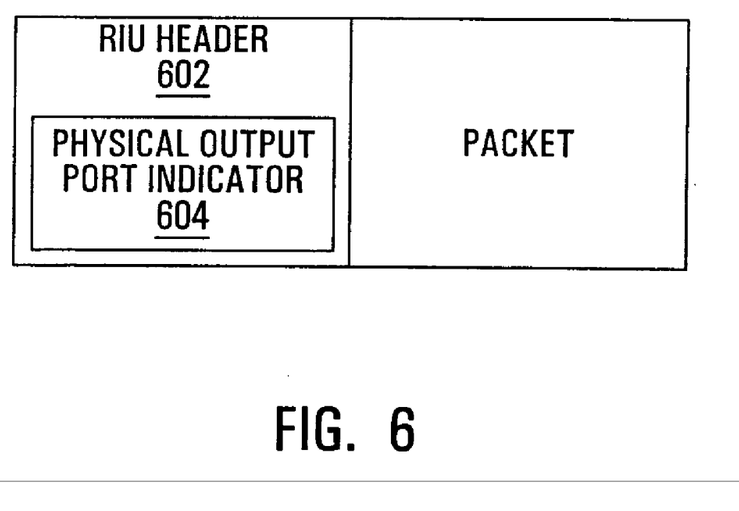
FIG. 6 illustrates a Rotator Information Unit (RIU) header according to a preferred embodiment of the present invention.

The supertrunking operation of the routing system of FIG. 2, according to the preferred embodiment of the present invention, is now described by example. The TCPIN, which is a series of packets that comprise a data flow (a TCP over IP stream in the preferred embodiment), is input to the input IPF node 210 packet by packet. The input IPF node 210 attaches a Packet Forwarding Header (PFH), described in detail herein below, and a Rotator Information Unit (RIU) header to each packet. Referring also to FIG. 6, the RIU header 602 comprises a physical output port indicator 604 that corresponds to a particular physical output port 212 determined, with use of a load balancing function also described in detail herein below, for the particular data flow in which the packet is comprised.

Each data flow, split into individual packets with heir respective PFH and RIU header, is then forwarded to its respective supertrunk output IPF node 212 via the line 222, the rotator space switch 202 of the first router 102, and the lines 224. The supertrunk output IPF node 212 when sequentially input with the packets of a data flow then proceeds to remove the PFH and RIU header from each of the packets and outputs the packets of the data flow to a physical link 112 between the first and second routers 102, 104.

The data flows are received packet by packet at the supertrunk input IPF nodes 214 and forwarded to the output IPF node 216 via the lines 228, the rotator space switch 202 of the second router 104, and the line 230. The output IPF node 216 outputs TCPOUT which, in this case, is a series of packets that comprise a data flow consistent with the data flow of TCPIN.

Figure 3:
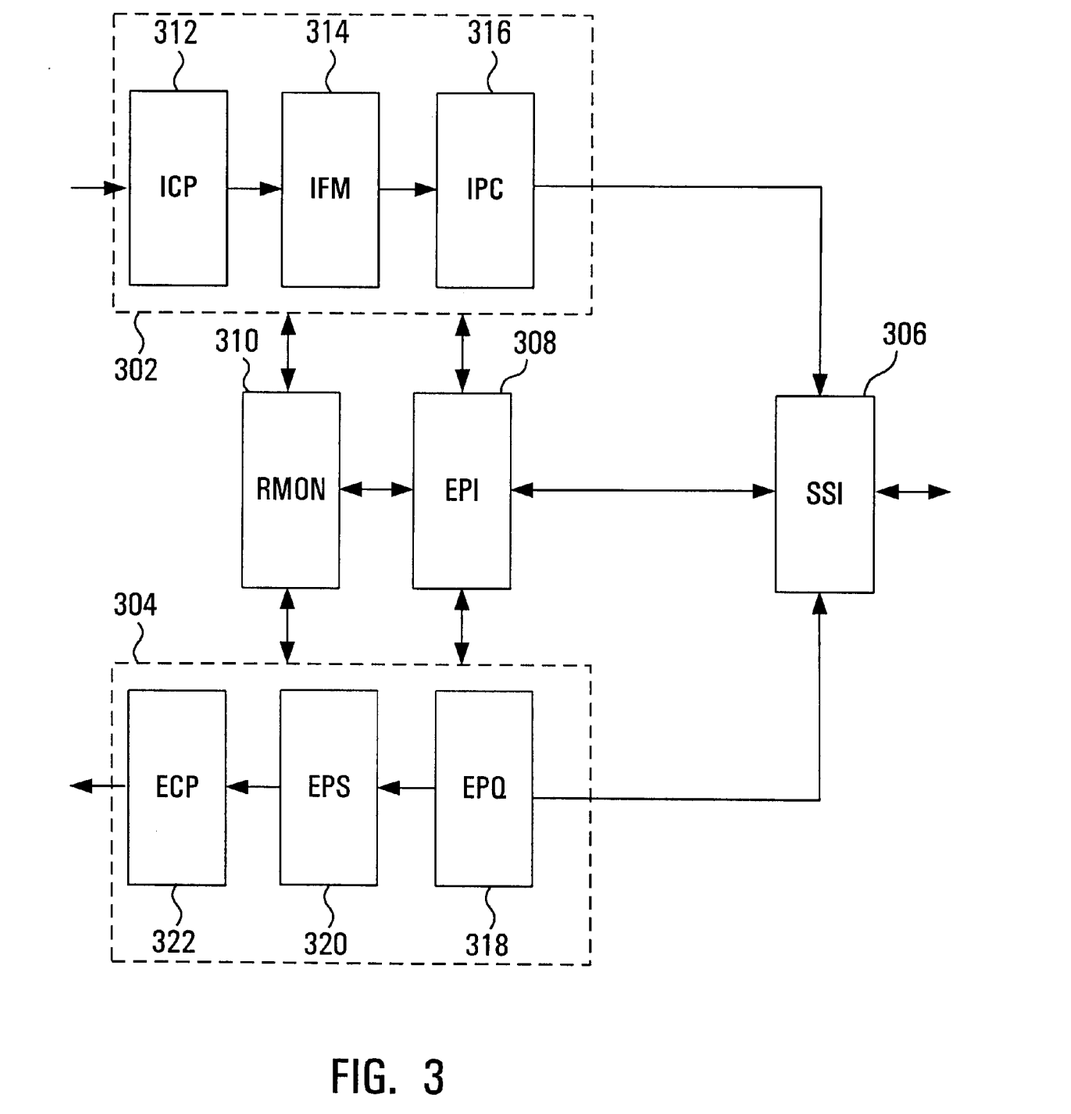
FIG. 3 is a block diagram of an Internet Protocol (IP) Forwarding (IPF) node used in FIG. 2.

The IPF nodes of FIG. 2 according to the preferred embodiment of the present invention are now described in detail with reference to FIG. 3. In this preferred embodiment, all of the IPF nodes are identical and therefore, all of the IPF nodes contain the load balancing function. As depicted in FIG. 3, each IPF node comprises an ingress block 302, an egress block 304, a Space Switch Interface (SSI) 306, an Embedded Processor Interface (EPI) 308, and a Router Monitor (RMON) 310. The ingress block 302 comprises an Ingress Convergence Processor (ICP) 312 coupled in series with an Ingress Filter and Mapper (IFM) 314, and an Ingress Port Controller (IPC) 316 further coupled to the SSI 306. The egress block 304 comprises an Egress Packet Queuer (EPQ) 318 coupled to the SSI 306 and further coupled in series with an Egress Packet Scheduler (EPS) 320, and an Egress Convergence Processor (ECP) 322. It is noted that according to the preferred embodiment, all of these components are discrete devices, though in alternative embodiments some or all of these components could be combined or implemented within software.

The EPI 308, in the preferred embodiment, is coupled to the components of both the ingress and egress blocks 302, 304 along with the SSI 306 and the RMON 310. The RMON 310 is further coupled to at least one component in each of the ingress and egress blocks 302, 304. In the preferred embodiment, the RMON 310 is coupled to the outputs of the IPC 316 and the EPS 320. The EPI 308 is the local processor for the IPF node that performs numerous processor related functions. The RMON 310, on the other hand, is utilized as a central point for all counters within the IPF node.

The following is a simplified description of the operation within the devices of the IPF node-during ingress and egress functions according to the preferred embodiment of the present invention. It is noted that the devices of FIG. 3, with the exception of the IPC 316, are not modified in the preferred embodiment of the present invention and one skilled in the art would understand their operations.

During the receiving of incoming data packets of a data flow, the ICP 312 terminates the ingress physical and link layer interfaces, verifies the link layer, IP headers, and formatting, maps the incoming packets to a Receive Context Identifier (RCI) that is a generic tag to uniquely identify the logical interface that a packet arrived on, and encapsulates each of the individual packets with a PFH. As described herein below, not all the contents of the PFH are inserted by the ICP 312, but bytes are reserved for the entire PFH.

Figure 4:
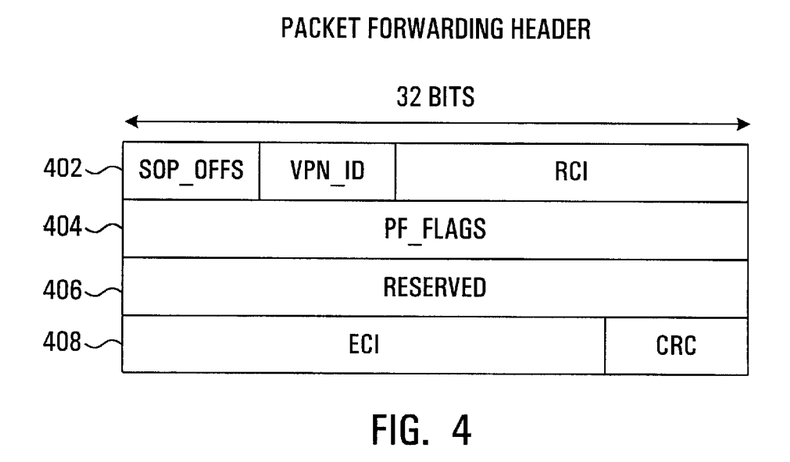
FIG. 4 illustrates a Packet Forwarding Header (PFH) according to preferred embodiment of the present invention.

The PFH, with reference to FIG. 4, comprises four 32 bit words. The first word 402 comprises a 4 bit Start Of Packet Offset (SOP_OFFS) signal that indicates the position of the first word of the packet to be sent to the link layer for segmentation, an 8 bit Virtual Private Network Identifier (VPN_ID) signal that identifies the virtual private network or virtual router interface that the packet arrived on, and the 20 bit RCI. The second word 404 comprises 32 bits of Packet Forwarding Flags (PF_FLAGS) that are a collection of generic status and control flags. The third word 406 comprises 32 reserved bits not utilized in the preferred embodiment of the present invention. The fourth word 408 comprises a 24 bit Egress Context Identifier (ECI) that is the result of a forwarding look-up function and is somewhat analogous to a flow identifier, and an 8 bit PFH Integrity Check (CRC). The contents of the first word 402 of the PFH are determined and inserted by the ICP 312 while the contents of the second word 404 can be set or modified by each of the blocks of the IPF node. The fourth word 408 is reserved space by the ICP 312, but the contents of the fourth word 408 are determined and inserted by another device as will described herein below.

The outputted packets from the ICP 312 are input to the IFM 314 which maps the incoming packets to the logical ECI, inserts the ECI into the PFH, and filters packets based on a configured policy. The IPC 316 then receives the packets, performs the load balancing function, as will be described herein below, and encapsulates each of the packets with a RIU header which maps the packet to physical output ports determined by the load balancing function. Within the present invention, all the packets of a particular data flow are mapped to the same physical output port.

Subsequently, the packets are sequentially input to the SSI 306 which is the interface between the rotator space switch 202 and the particular IPF of FIG. 2. The SSI 306 then outputs the packets through the rotator space switch to the particular physical output port chosen by the load balancing function for the particular data flow.

At the physical output port, the packet is input to the SSI 306 and forwarded, via the EPQ 318 and the EPS 320, to the ECP 322. The ECP 322 subsequently removes the PFH and RIU header from each of the packets and forwards the packets, via a physical link, to a physical input port; that being an IPF node within the router of the destination output IPF node.

Within the preferred embodiment of the present invention, the packets are received at the physical input port and input to the corresponding ICP 312. The ICP 312 and the IFM 314 perform similar functions as described herein above, such as attaching a PFH to each of the packets, and sequentially forwarding the packets to the IPC 316. The load balancing function within the IPC 316 is not performed on the packets of the data flow since the output IPF node for the flow is an IPF node within the same router. The IPC 316 simply attaches an RIU header, which maps the packet to its output IPF node, to each of the packets and forwards them, via the SSI 306 and the rotator space switch, to the SSI 306 of the output IPF node.

The packet is forwarded by the SSI 306 of the output IPF node to the EPQ 318. The EPQ 318 reassembles packet segments and notifies the EPS 320 of the availability of packets to be scheduled. Since all packets of a particular data flow are routed via the same physical output port, the packets remain in the proper order. Hence, each packet that is reassembled becomes available for scheduling without the need for a re-ordering function. Subsequently, the EPS 320 maps the packets to scheduling queues and outputs the packets to the ECP 322 which removes the PFH and RIU header and performs L2 and PHY encapsulation functions as required.

Figure 5:
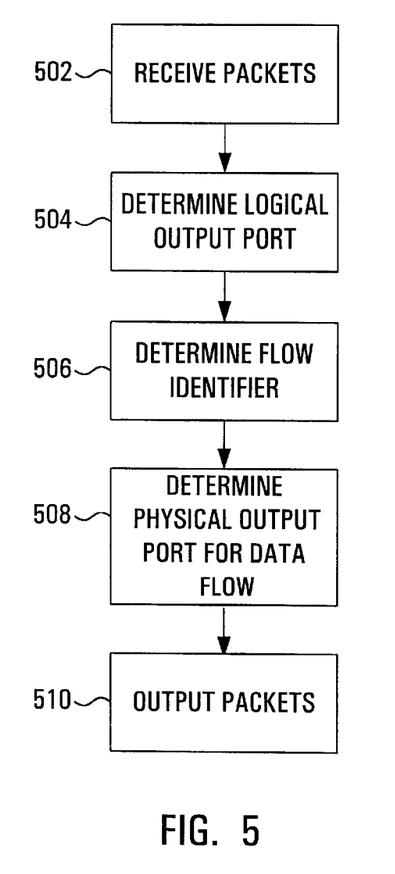
FIG. 5 is a flow chart illustrating steps performed by the Ingress Port Controller (IPC) according to the preferred embodiment of the present invention.

The detailed description of the load balancing function, according to the preferred embodiment of the present invention, performed within the IPC 316 is now described with reference to FIG. 5. Firstly, as depicted at step 502, the IPC 316 receives a packet from the IFM 314. Next, the IPC 316 determines, at step 504, the logical output port corresponding to the input packet. This is done, in the preferred embodiment, by reading the ECI within the PFH that was inserted by the IFM 314 after a look-up function was completed.

Subsequently at step 506, a flow identifier is determined for the packet. The flow identifier is a unique identifier for the data flow, preferably a TCP over IP stream. One characteristic that defines a data flow is the ECI in which the packet has been assigned. In the preferred embodiment, the data flows are TCP streams which have specific start and end packets. The ECI of the packet is used in combination with specific TCP control fields to determine an index into a look-up table which will hold the flow identifier for the data flow. After the arrival of a start packet for a particular data flow, a new flow identifier is assigned in the look-up table to the particular data flow. Subsequent packets of the same flow, prior to the end packet being received, are assigned the identical flow identifier. When the end packet of the particular TCP flow is received, the flow is terminated and the corresponding flow identifier is removed from the look-up table so it can be reused by a new TCP flow. In the preferred embodiment, a flow identifier is also removed from the look-up table after a predetermined refresh period has expired that indicates that no further packets of that particular data flow are still to arrive.

The next step within the load balancing function, as depicted at step 508, is to determine the physical output port for the packet to traverse. If the packet is not the first of its data flow to be routed, the look-up table described above for the flow identifier would also indicate the physical output port for the particular packet. If the packet is the first packet of its data flow, the load balancing function determines the physical output port for its data flow and saves this determined physical output port selection within the look-up table for further packets of the same data flow to utilize. This determination of the physical output port is the key to the effectiveness of the load balancing function and can be done in numerous different ways.

According to the preferred embodiment of the present invention, a Link Available Bandwidth (LAB) in units of bytes/sec is generated within the load balancing function for each of the available physical output ports. This is determined with use of the following formula:

$$LAB=(LBW)-(IR)*(APS)$$

where, LBW is the Link Bandwidth in units of bytes/sec, IR is the Input Rate in units of packets/sec, and APS is the Average Packet Size. The LBW is known for each available physical output port while the IR and the APS are generated, within the preferred embodiment, by statistical means described herein below.

To calculate, according to the preferred embodiment, the IR of a particular physical output port, an exponentially weighted moving average (EWMA) technique is used that generates a continuously adjusting long term average of the number of packets per second being routed through the particular physical output port. To calculate, according to the preferred embodiment, the APS for all the physical output ports, an EWMA technique is also used that generates a long term average of the size of the packets being sent. In an alternative embodiment, the APS is calculated once using a large amount of data and subsequently is constant.

In the preferred embodiment, this calculation of LABs for each physical output port is done within each IPC 316, though in an alternative embodiment these calculations are done in a central location within the router, such as the route controller, and the calculated LABs are bused to the individual IPF nodes.

The size of the LABs indicate the availability of bandwidth for the incoming data flow and therefore, to make load balancing optimal, the current data flow is directed to the physical output port with the largest LAB. The packet is directed to a particular physical output port, according to the preferred embodiment, by writing to the RIU header attached to each of the packets of the particular data flow. Finally, at step 510, the packets are individually output from the IPC 316 and directed to the physical output port assigned to their corresponding data flow while maintaining the proper order.

The key advantage of this load balancing of data flows among multiple physical links that comprise a supertrunk is that the user gains the advantages of using a supertrunk while not requiring the router that receives the packets of the data flow to re-order them due to differences in delays on the particular physical links. This means that traditional routers without supertrunk technology can be utilized as receiving routers according to the preferred embodiment of the present invention with no special treatment required for the super-trunked packets compared to regular non-supertrunked packets.

Alternative embodiments of the present invention may use different methods to determine the physical output port for a data flow compared to that disclosed herein for the preferred embodiment. One such alternative technique is disclosed within the previously referenced U.S. patent application entitled "Supertrunking for Packet Switching" by Almulhem et al, previously incorporated by reference. This method of determining physical output ports is specific to packet-level load balancing, but one skilled in the art would understand that it could be modified for flow-level load balancing as described herein.

One skilled in the art would recognize that the data flows being input to the router could be TCP flows or more specifically, IP streams that comprise a series of IP packets. In this case, the logical link for the data flow can be read from the IP header within each individual packet.

Persons skilled in the art will appreciate that there are alternative implementations and modifications possible to use an apparatus similar to that described above to provide a routing system over multiple physical links, and that the above implementation is only an illustration of this embodiment of the invention. The scope of the invention, therefore, is only to be limited by the claims appended hereto.

What is claimed is:

1. A forwarding node capable of operation within a router connected to a supertrunk, the router transferring digital data over the supertrunk with a plurality of other routers within a packet routing system, the forwarding node comprising:

a load balancing device that, when input with individual packets of a data flow, reads a logical output port of the supertrunk corresponding to the data flow, assigns the data flow to a physical output port within the logical output port based upon physical link criteria, and outputs the individual packets to their assigned physical output port, wherein the load balancing device assigns the data flow to a physical output port by determining a physical output port for the data flow and encapsulating each of the packets of the data flow with a routing header that comprises a physical output port identifier;

wherein the forwarding node further comprises a packet receiving device that, when input with an encapsulated packet, removes the routing header from the packet and outputs the packet to a transmission apparatus, wherein the routing header comprises a rotator information unit header; and wherein the rotator information unit header comprises the physical output port identifier.

2. A forwarding node capable of operation within a router connected to a supertrunk, the router transferring digital data over the supertrunk with a plurality of other routers within a packet routing system, the forwarding node comprising:

a load balancing device that, when input with individual packets of a data flow, reads a logical output port of the supertrunk corresponding to the data flow, assigns the data flow to a physical output port within the logical output port based upon physical link criteria, and outputs the individual packets to their assigned physical output port, wherein, when a first packet of a data flow is detected, the load balancing device determines a physical output port to assign to the particular packet and to store in a look-up table for the corresponding data flow and, when a packet is not the first packet of a data flow, the packet is assigned the physical output port corresponding to its data flow with use of the look-up table, wherein the load balancing device further encapsulates the packets with a routing header that comprises a packet forwarding header and a rotator information unit header;

wherein the forwarding node further comprises a packet receiving device that, when input with an encapsulated packet, removes the routing header from the packet and outputs the packet to a transmission apparatus; and wherein the packet forwarding header comprises an egress context identifier and the rotator information unit header comprises a physical output port identifier.

3. A forwarding node according to claim 2, wherein the egress context identifier is determined for each packet with use of a second look-up table.

4. A forwarding node capable of operation within a router connected to a supertrunk, the router transferring digital data over the supertrunk with a plurality of other routers within a packet routing system, the forwarding node comprising:

a load balancing device that, when input with individual packets of a data flow, reads a logical output port of the supertrunk corresponding to the data flow, assigns the data flow to a physical output port within the logical output port based upon physical link criteria, and outputs the individual packets to their assigned physical output port;

wherein the physical link criteria are link available bandwidth (LAB) factors calculated for each of the available physical output ports, each of the LAB factors for a particular physical output port equalling an input rate multiplied by an average packet size, subtracted from a total link bandwidth; and wherein the input rate is calculated with use of an exponentially weighted moving average technique.

5. A forwarding node capable of operation within a router connected to a supertrunk, the router transferring digital data over the supertrunk with a plurality of other routers within a packet routing system, the forwarding node comprising:

a load balancing device that, when input with individual packets of a data flow, reads a logical output port of the supertrunk corresponding to the data flow, assigns the data flow to a physical output port within the logical output port based upon physical link criteria, and outputs the individual packets to their assigned physical output port;

wherein the physical link criteria are link available bandwidth (LAB) factors calculated for each of the available physical output ports, each of the LAB factors for a particular physical output port equalling an input rate multiplied by an average packet size, subtracted from a total link bandwidth; and wherein the average packet size is calculated with use of an exponentially weighted moving average technique.

6. In a packet routing system comprising a plurality of routers, a method of transferring digital data over a supertrunk between the routers comprising the steps of:

inputting individual packets of a data into a first router;

reading a logical output port of the supertrunk corresponding to the data flow of the individual packets;

assigning each of the data flows to a physical output port within the logical output port based upon physical link criteria;

transmitting each of the packets, via their assigned physical output ports, to a second router; and outputting a data flow corresponding to the packets received at the second router;

wherein assigning each of the data flows to a physical output comprises determining a physical output port for the data flow and encapsulating each of the packets with a routing header that comprises a physical output port identifier;

wherein transmitting each of the packets comprises receiving the packet at the physical output port, removing the routing header from the packet and outputting the packet for transmission to the second router;

wherein the routing header comprises a rotator information unit header; and wherein the rotator information unit header comprises the physical output port identifier.

7. In a packet routing system comprising a plurality of routers, a method of transferring digital data over a supertrunk between the routers comprising the steps of:

inputting individual packets of a data into a first router;

reading a logical output port of the supertrunk corresponding to the data flow of the individual packets;

assigning each of the data flows to a physical output port within the logical output port based upon physical link criteria;

transmitting each of the packets, via their assigned physical output ports, to a second router; and outputting a data flow corresponding to the packets received at the second router;

further comprising:

when a first packet of a data flow is detected, determining a physical output port to assign to the particular packet and to store in a look-up table for the corresponding data flow; and when a packet is not the first packet of a data flow, assigning the packet the physical output port corresponding to its data flow with use of the look-up table; and further comprising:

encapsulating the packets with a routing header that comprises a packet forwarding header and a rotator information unit header, wherein transmitting each of the packets comprises receiving the packet at the physical output port, removing the routing header from the packet and outputting the packet for transmission to the second router, and wherein the packet forwarding header information comprises an egress context identifier and the rotator information unit header comprises a physical output port identifier.

8. A method according to claim 7, wherein the egress context identifier is determined for each packet with use of a second look-up table.

9. In a packet routing system comprising a plurality of routers, a method of transferring digital data over a supertrunk between the routers comprising the steps of:

inputting individual packets of a data into a first router;

reading a logical output port of the supertrunk corresponding to the data flow of the individual packets;

assigning each of the data flows to a physical output port within the logical output port based upon physical link criteria;

transmitting each of the packets, via their assigned physical output ports, to a second router; and outputting a data flow corresponding to the packets received at the second router;

wherein the physical link criteria are link available bandwidth (LAB) factors calculated for each of the available physical output ports, each of the LAB factors for a particular physical output port equalling an input rate multiplied by an average packet size, subtracted from a total link bandwidth;

wherein the input rate is calculated with use of an exponentially weighted moving average technique.

10. In a packet routing system comprising a plurality of routers, a method of transferring digital data over a supertrunk between the routers comprising the steps of:

inputting individual packets of a data into a first router;

reading a logical output port of the supertrunk corresponding to the data flow of the individual packets;

assigning each of the data flows to a physical output port within the logical output port based upon physical link criteria;

transmitting each of the packets, via their assigned physical output ports, to a second router; and outputting a data flow corresponding to the packets received at the second router;

wherein the physical link criteria are link available bandwidth (LAB) factors calculated for each of the available physical output ports, each of the LAB factors for a particular physical output port equalling an input rate multiplied by an average packet size, subtracted from a total link bandwidth; and wherein the average packet size is calculated with use of an exponentially weighted moving average technique.

11. A load balancing device capable of operation in a forwarding node used in a router connected to a supertrunk, the router transferring data over the supertrunk with a plurality of other routers within a packet routing system, the load balancing device, when input with individual packets of a data flow, adapted to:

read a logical output port of the supertrunk corresponding to the data flow;

assign the data flow to a physical output port within the logical output port based upon physical link criteria; and output the individual packets to their assigned physical output port;

wherein the load balancing device assigns the data flow to a physical output port by determining a physical output port for the data flow and encapsulating each of the packets of the data flow with a routing header that comprises a physical output port identifier;

wherein the forwarding node comprises a packet receiving device that, when input with an encapsulated packet, removes the routing header from the packet and outputs the packet to a transmission apparatus;

wherein the routing header comprises a rotator information unit header; and wherein the rotator information unit header comprises the physical output port identifier.

12. A load balancing device according to claim 11, wherein, when a first packet of a data flow is detected, the load balancing device determines a physical output port to assign to the particular packet and to store in a look-up table for the corresponding data flow and, when a packet is not the first packet of a data flow, the packet is assigned the physical output port corresponding to its data flow with use of the look-up table.

13. A load balancing device capable of operation in a forwarding node used in a router connected to a supertrunk, the router transferring data over the supertrunk with a plurality of other routers within a packet routing system, the load balancing device, when input with individual packets of a data flow, adapted to:

read a logical output port of the supertrunk corresponding to the data flow;

assign the data flow to a physical output port within the logical output port based upon physical link criteria; and output the individual packets to their assigned physical output port;

wherein, when a first packet of a data flow is detected, the load balancing device determines a physical output port to assign to the particular packet and to store in a look-up table for the corresponding data flow and, when a packet is not the first packet of a data flow, the packet is assigned the physical output port corresponding to its data flow with use of the look-up table;

the load balancing device further adapted to:

encapsulate the packets with a routing header that comprises a packet forwarding header and a rotator information unit header;

wherein the forwarding node comprises a packet receiving device that, when input with an encapsulated packet, removes the routing header from the packet and outputs the packet to a transmission apparatus; and wherein the packet forwarding header comprises an egress context identifier and the rotator information unit header comprises a physical output port identifier.

14. A load balancing device according to claim 13, wherein the egress context identifier is determined for each packet with use of a second look-up table.

15. A load balancing device capable of operation in a forwarding node used in a router connected to a supertrunk, the router transferring data over the supertrunk with a plurality of other routers within a packet routing system, the load balancing device, when input with individual packets of a data flow, adapted to:

read a logical output port of the supertrunk corresponding to the data flow;

assign the data flow to a physical output port within the logical output port based upon physical link criteria; and output the individual packets to their assigned physical output port;

wherein the physical link criteria are link available bandwidth (LAB) factors calculated for each of the available physical output ports, each of the LAB factors for a particular physical output port equalling an input rate multiplied by an average packet size, subtracted from a total link bandwidth; and wherein the input rate is calculated with use of an exponentially weighted moving average technique.

16. A load balancing device capable of operation in a forwarding node used in a router connected to a supertrunk, the router transferring data over the supertrunk with a plurality of other routers within a packet routing system, the load balancing device, when input with individual packets of a data flow, adapted to:

read a logical output port of the supertrunk corresponding to the data flow;

assign the data flow to a physical output port within the logical output port based upon physical link criteria; and output the individual packets to their assigned physical output port;

wherein the physical link criteria are link available bandwidth (LAD) factors calculated for each of the available physical output ports, each of the LAB factors for a particular physical output port equalling an input rate multiplied by an average packet size, subtracted from a total link bandwidth; and wherein the average packet size is calculated with use of an exponentially weighted moving average technique.

* * * * *

UNITED STATES PATENT AND TRADEMARK OFFICE
CERTIFICATE OF CORRECTION

PATENT NO. : 6,510,135 B1
DATED : January 21, 2003
INVENTOR(S) : Almulheim et al.

It is certified that error appears in the above-identified patent and that said Letters Patent is hereby corrected as shown below:

Drawings,
Add drawing sheet consisting of Fig. 6 as shown on the attached page.

Column 14,
Line 45, "(LAD)" should read -- (LAB) --

Signed and Sealed this

Twenty-fourth Day of August, 2004

JON W. DUDAS
*Director of the United States Patent and Trademark Office*

FIG. 6